United States Patent [19]
Finkelstein et al.

[11] Patent Number: 5,434,405
[45] Date of Patent: Jul. 18, 1995

[54] CREDIT CARD WITH A FRESNEL MAGNIFYING LENS FORMED IN A SECTION OF THE TRANSPARENT CORE

[76] Inventors: Alan Finkelstein, 12644 Mulholland, Beverly Hills, Calif. 90210; Donald A. Dixon, 355 N. Mill St., Aspen, Colo. 81611; Robert H. Boede, 6375 Dowling Rd., Omro, Wis. 54963

[21] Appl. No.: 197,218

[22] Filed: Feb. 16, 1994

Related U.S. Application Data

[63] Continuation-in-part of Ser. No. 834,490, Feb. 12, 1992.

[51] Int. Cl.6 .................................... G06K 7/10
[52] U.S. Cl. .................... 235/487; 283/904; 283/109; 359/802; 359/806; 359/809
[58] Field of Search ............. 235/487, 488, 493, 449; 359/802, 803, 804, 806, 807, 808, 809, 810, 811; 40/365, 625; 283/109, 76, 904

[56] References Cited

U.S. PATENT DOCUMENTS

| | | | |
|---|---|---|---|
| 3,117,608 | 1/1964 | Goss et al. | 283/76 X |
| 4,393,610 | 7/1983 | Adrian | 283/904 X |
| 4,435,912 | 3/1984 | Adrian et al. | 283/76 X |
| 4,863,026 | 9/1989 | Perkowski | 359/809 X |
| 5,151,582 | 9/1992 | Fujioka | 235/469 |
| 5,215,334 | 6/1993 | Presson et al. | 283/76 |

FOREIGN PATENT DOCUMENTS

| | | | |
|---|---|---|---|
| 0032368 | 7/1981 | European Pat. Off. | 283/904 |
| 0083015 | 6/1980 | Japan | 359/809 |

*Primary Examiner*—John Shepperd
*Assistant Examiner*—Michael G. Lee

[57] ABSTRACT

A financial transaction card adapted for individual use in reading information stored externally to the card, having machine readable information contained thereon identifying the user and the issuing institution for transacting business at locations remote from the issuing institution, includes:

a. a rigid substantially rectangular base comprising a substantially transparent material and having a top surface and a bottom surface;
b. machine readable information carried on the base for identifying the user and the issuing institution; and
c. a magnifying lens produced by formation of fresnel contour lines on the top surface of the base and in non-interfering relationship with the machine readable information.

25 Claims, 3 Drawing Sheets

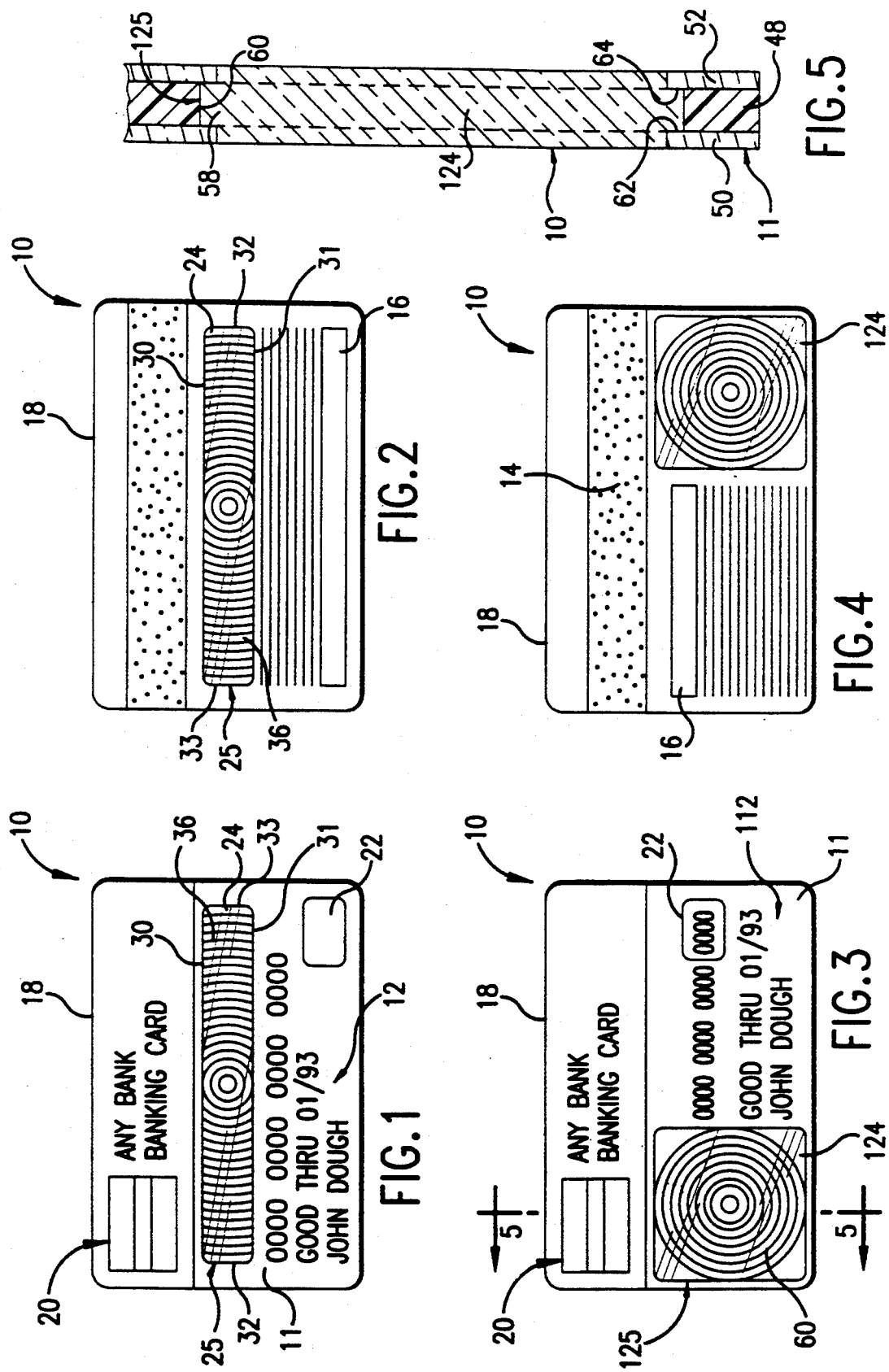

CREDIT CARD WITH A FRESNEL MAGNIFYING LENS FORMED IN A SECTION OF THE TRANSPARENT CORE

This is a continuation-in-part of U.S. patent application Ser. No. 7/834,490, filed Feb. 12, 1992, which is incorporated herein by reference.

FIELD OF THE INVENTION

The present invention relates to pocket magnifiers and is specifically directed to a credit card having an integral magnifying lens.

BACKGROUND OF THE INVENTION

There have long been reading lenses and magnifying glasses available to assist people in reading books, documents and the like without the use of reading glasses. These are particularly useful when the person encounters small print during an activity which makes it inconvenient or difficult to stop and put on reading glasses.

As an example, a book mark such as that shown in U.S. Pat. No. 3,140,883 issued to R. L. Anthony on Jul. 14, 1964 may be integrally attached to a book such as a telephone directory or a dictionary, wherein the end of the book mark is provided with a sealed pocket for receiving a plastic magnifying lens. The magnifying lens may be moved up and down the page as desired to provide magnification of the text in the book. This permits the user to read the text without first putting on his eyeglasses.

A pocket magnifier such as that shown in U.S. Pat. No. 3,409,347 issued to R. Vogel on Nov. 5, 1968 includes a pocket pouch adapted to be carried in the breast or hip pocket of the user or in a purse or wallet. The lens is formed of a transparent plastic sheet material having a substantial degree of stiffness and having fresnel lens contours molded into its upper surface. The lens unit may be slidably retracted into and extended out of the pocket. The pocket magnifier may be easily utilized to magnify small print and the like when the user is in a location where it is not feasible or desirable to stop an activity in order to put on reading glasses.

Other examples of special purposes magnifying lens structures are shown, by way of example, in U.S. Pat. No. 4,044,889 entitled "Cosmetic Container Including Integrated Lens Structure," issued to S. Orentreich et al. on Aug. 30, 1977, and U.S. Pat. No. 4,393,610 entitled "Card Carrying Microfilm and Associated Reading Lens and Process of Forming Same," issued to D. Adrian on Jul. 19, 1983.

With the ever expanding use of credit cards and other financial transaction cards, there is an increasing requirement that the card user be able to verify a transaction at the point-of-use. This means the user must be able to read the card invoice to determine the accuracy of the information before he signs the invoice to indicate his acceptance. Since most of the information on the invoice is impact printed either on a carbon set or carbonless form, the print is not only controlled in size but is often of a low contrast with respect to the base form paper. This makes the form difficult to read, particularly for those who normally require reading glasses. Also, when the transaction card is used, it is often not convenient to take the time to put on reading glasses before reviewing the card invoice. While the pocket magnifiers of the prior art could be used for this purpose, use of such devices requires a separate activity which does not provide a great improvement over the use of reading glasses. As a result, many credit card users simply do not take the time and effort to accurately verify a transaction at the point-of-sale, relying on the sales clerk for the accuracy of the information.

It is, therefore, desirable to provide ready means for immediate verification of credit card and other financial card transactions at the point-of-sale in a convenient manner not requiring extraneous activity such as locating and using a pocket magnifier or taking the time to put on reading glasses in order to be able to accurately read the invoice. None of the devices of the prior art address this need.

SUMMARY OF THE PREFERRED EMBODIMENTS

It is, therefore, an object and feature of the subject invention to provide for a credit card having an integral magnifying lens permitting the user to immediately verify financial transactions at the point-of-sale without first requiring that the user put on reading glasses or the like.

It is another object and feature of the invention to enhance the use of credit cards by permitting immediate verification of credit card transactions by users normally having difficulty in reading small print, without requiring an additional activity of locating a magnifying lens or putting on reading glasses.

It is another object and feature of the subject invention to provide for a credit card having an integral magnifying lens and adapted for enlarging the small print generally used in the confined space of the credit card transaction form.

It is yet another object and feature of the invention to provide for an integral lens in a financial transaction card wherein the lens does not interfere with the machine readable information required on the card in order to complete a point-of-sale transaction.

The subject invention is directed to a financial transaction card such as a credit card or the like which incorporates an integral magnifying lens. Use of the card of the subject invention automatically places a magnifying lens at the disposal of the user, whereby he may immediately verify a financial transaction at the point-of-sale without first locating a magnifying glass or taking the time and effort to put on reading glasses. The invention is particularly useful when making credit card transactions during an activity where the user would not normally be wearing his reading glasses. For example, during sports activities or other types of activities where a person does not normally encounter reading material, it may be desirable to make a credit card transaction in order to pay for rental of equipment or user fees or the like. By using the credit card of the subject invention, the user can immediately read and verify the financial transaction at the point-of-sale by placing the magnifying lens incorporated in the credit card over the printed material on the transaction form. Thus, the print is magnified with the card used for the transaction, eliminating the need to locate a pocket magnifier or the time and effort required to put on reading glasses in order to verify the transaction.

In the preferred form of the invention, a typical credit card blank is subdivided into a plurality of zones, specifically a data zone and a non-data zone. The data zone is adapted for receiving and carrying machine readable information such as a magnetic strip including magnetically encoded information and embossed alpha numeric lettering for creating an imprint on the credit card transaction form. The non-data zone is generally free of any information required to be machine read, although this zone often includes identifying indicia, logo types and other information relating to the issuing institution. In the preferred form of the invention, a portion of the non-data zone includes an integral magnifying lens carried in and forming a part of the credit card. It has been found that a substantially rigid, transparent plastic material of a thickness corresponding to the thickness of the credit card base may be incorporated in a window provided in the base. In the preferred embodiment of the invention, the transparent plastic includes fresnel lens contours on the top surface for defining a magnifying lens. By placing the lens in the non-data zone, the lens does not interfere with the machine transactions required in order to use the credit card at a point-of-sale.

In one embodiment of the invention, the lens is an elongated rectangle generally placed in parallel with the magnetic strip which is commonly attached to the back of the credit card. In this embodiment, there is no alteration of the data zone as commonly incorporated on credit cards.

A second embodiment of the invention incorporates a lens with a larger usable area. However, this particular embodiment requires alteration of the data zone. Depending on the issuing institution, one embodiment may be more desirable over the other, depending on the flexibility of the location and format of the data zones on the card.

In a typical credit card, the base is made of a substantially rigid plastic material which is laminated with a thin printed material on both the top surface and the bottom surface thereof, including identifying indicia, logo types and the like on the top, the magnetic strip, a signature strip and various terms and conditions on the bottom. In one embodiment of the invention, the lens may be placed in the credit card prior to the laminating process, whereby the laminate cover materials may be used to overlap the edge of the lens and help retain it in the credit card. The lens may be sonic welded, adhesively secured or otherwise mounted in a window in the credit case base, with or without utilizing the laminate material to assist in framing and mounting the lens in the credit card.

In a particularly preferred embodiment, the lens is integral with the credit card base. In this embodiment, the credit card base is formed from a transparent material, most preferably an amorphous plastic, and fresnel lens contours are then stamped on the top surface of the blank in a selected area to define the magnifying lens. The stamped credit card base can be overprinted, laminated with printed material, etc.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which FIG. 1 shows the top side of a credit card incorporating a magnifying lens, in accordance with the subject invention;

FIG. 2 shows the bottom side of the credit card of FIG. 1;

FIG. 3 shows the top side of an alternative embodiment of a credit card incorporated magnifying lens in accordance with the subject invention;

FIG. 4 shows the bottom side of the credit card of FIG. 3;

FIG. 5 is a cross sectional view of the credit card and lens combination, taking generally along the line 5—5 of FIG. 1;

DETAILED DESCRIPTION OF THE PREFERRED EMBODIMENTS

Figure 6:
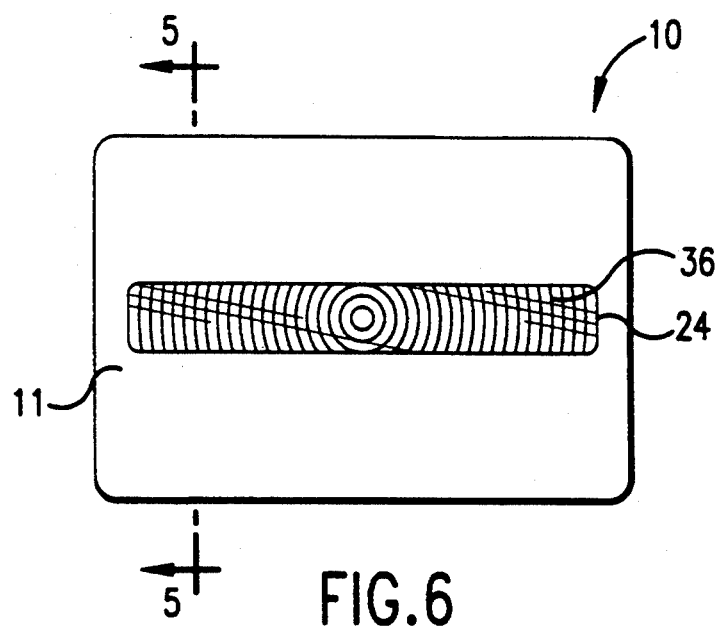
FIG. 6 shows the top side of a credit card blank having an integral magnifying lens.

A typical financial transaction card such as the credit card 10 is shown in FIG. 1 and includes, as is common, embossed lettering at 12, which is machine readable for permitting the credit card to be imprinted at a point-of-sale transaction. As is shown in FIG. 2, most credit cards now contain a magnetic strip material 14 which includes magnetically encoded information readable by computer terminals utilized in many point-of-sale terminals. Also included is a signature strip 16 which is on the back of the card and adapted for receiving a manually applied signature to be applied by the user of the card.

The magnetic strip 14 and embossed lettering 12, along with the signature strip 16, identify a data zone on the card. This data zone is generally controlled by financial institutions in an effort to standardize the cards so that various cards issued by a multiplicity of institutions may be used on standardized terminals the point-of-sale. For example, the placement of the magnetic strip 14 relative to the top edge 18 of the card is standardized, as is the width of the strip 14 in order to permit ready readability of the magnetically coded information by any typical point-of-sale magnetic reader. Likewise, the font, size and position of the embossed lettering 12 is controlled to assure machine readability of the information imprinted from the card when a point-of-sale transaction is made on a typical credit card imprinter. Only the position of the signature strip 16 can be altered without interfering with the machine readability of the card.

Today, many cards also include identifying indicia such as logo types and the like as indicated at 20 for identifying the issuing institution. An increasing number of cards also include a hologram patch 22 which includes issuing institution indicia. The hologram panel 22 is generally located in or near the portion of the data zone including the embossed lettering 12. In the embodiment of the invention shown in FIGS. 1 and 2, a magnifying lens 24 is positioned in a window 25 provided in the base 11 of the card 10 such that it is in noninterfering relationship with the magnetic strip 14 and the embossed lettering 12. The magnetic lens 24 is an elongate, rectangular lens mounted parallel to the magnetic strip 14 in the space between the magnetic strip and the embossed lettering. This space is generally sufficient in size to accommodate the lens 24 since it is required that the embossed lettering 12 be spaced sufficiently from the magnetic strip 14 to assure that the embossing of the card does not in any way alter the functionality of the magnetic strip.

In the preferred embodiment of the invention, the lens member 24 comprises a substantially rigid, transparent plastic element having approximately the same rigidity as the credit card base. As shown in FIGS. 1 and 2, the credit card base 11 includes a window 25 having a top edge 30, a bottom edge 31 and side edges 32 and 33. The lens element 24 is adapted to be placed in the window 25 and has outer edges common with the window edges 30-33. The lens may then be sonic welded or adhesively secured to the credit card base 11 in the manner well known to those who are skilled in the art. In the preferred embodiment of the invention, the lens 24 is of a thickness corresponding to the thickness of the credit card base 11, assuring that the presence of the lens in the credit card does not interfere in any manner with the machine readability of the information contained in the embossed lettering 12 or in the magnetic strip 14.

A fresnel-type contour lens has been found to be particularly useful for this type of application. The fresnel contour lines 36 or ribs are typically contained on the top side of the lens, or the front of the credit card as shown in FIG. 1. This permits the credit card to be held with the front side up in typical manner, when utilizing the magnifying lens.

An alternative embodiment of the invention is shown in FIGS. 3 and 4. There, the lens element 124 is of a substantially square cross section utilizing a fresnel lens comprising the concentric circle configuration shown at 60, and mounted in a complementary window 125 in the base 11. This particular configuration of the invention is useful when it is possible to alter the shape of the data zone and the placement of the embossed lettering 112. As terminal encoders come more widely accepted, and the magnetic encoding strip 14 (FIG. 4) more commonly used as the source for machine readable information, the importance of the embossed lettering is becoming diminished. This will permit alteration of the placement of the embossed lettering on the card without interfering with the machine readability of the card at the point of sale. This permits the embossed lens element 124 to be customized to varying desires and taste without interfering with the overall machine readability of the credit card.

As is shown in FIG. 5, the typical credit card base 11 is a laminated composite member including a solid core material as shown at 48 with a thin plastic laminate 50 on the top surface and a similar thin plastic material 52 laminated on the bottom surface. The laminates 50 and 52 are generally printed in a four-color format permitting attractive logotypes identifying the financial institution and permitting customized color schemes for the card. The laminate materials 50 and 52 also carry the magnetic encoding strip 14, the signature strip 16 and the hologram panel 22. As shown in FIG. 5, the fresnel lens element 124 is located in the window 125 of the credit card and may be secured therein by sonic welding, adhesives or the like along the side edges of the window, as at 60. Where the laminated card is used, the laminate material 50 and 52 may overlap the edges 62, 64 of the window and the lens 124 may include a peripheral lip or rim 58 for holding the lens in place. Of course, the lens may also be of a rectangular cross section and sonically welded or adhesively secured to the base 11 with or without use of the laminates 50 and 52.

Figure 7:
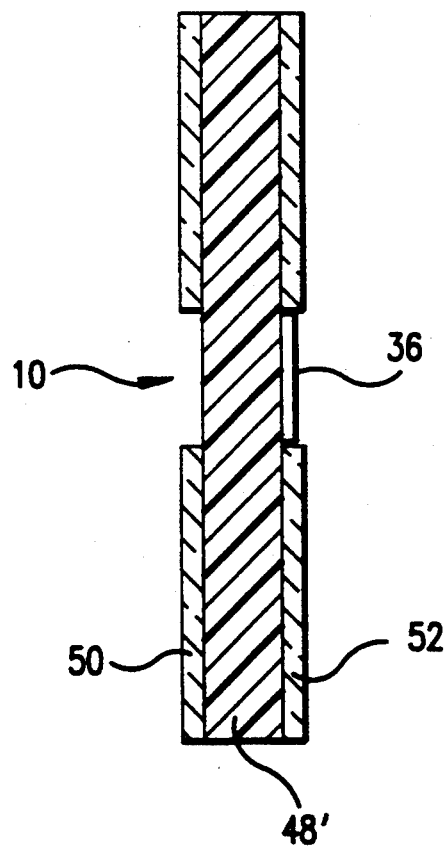
FIG. 7 is a cross sectional view of the credit card blank of FIG. 6 taken generally along the line 5—5 of FIG. 6.

It will be understood that the lens could be incorporated in the card in a variety of ways, including being an integral, unitary member of the card base. FIGS. 6 and 7 illustrate the alternative embodiment of the invention in which the lens is integral with a core 48'. Core 48' comprises a substantially transparent plastic material. Preferably, the material is an amorphous plastic, such as polyvinyl chloride (PVC), polycarbonate, polyester or any other similar material. Lens 24 is formed in core 48' by, for example, stamping the desired fresnel contour lines 36 onto the top surface thereof. Embossed lettering (not shown) can be formed in core 48' simultaneously, or can be formed before or after the fresnel contour lines 36 are stamped onto core 48'. Plastic laminates 50 and 52 can also be applied to the top and bottom surfaces of core 48' to form the credit card base 11. The order in which the foregoing stamping, embossing and laminating steps are carried out is a matter of routine design choice.

Figure 8:
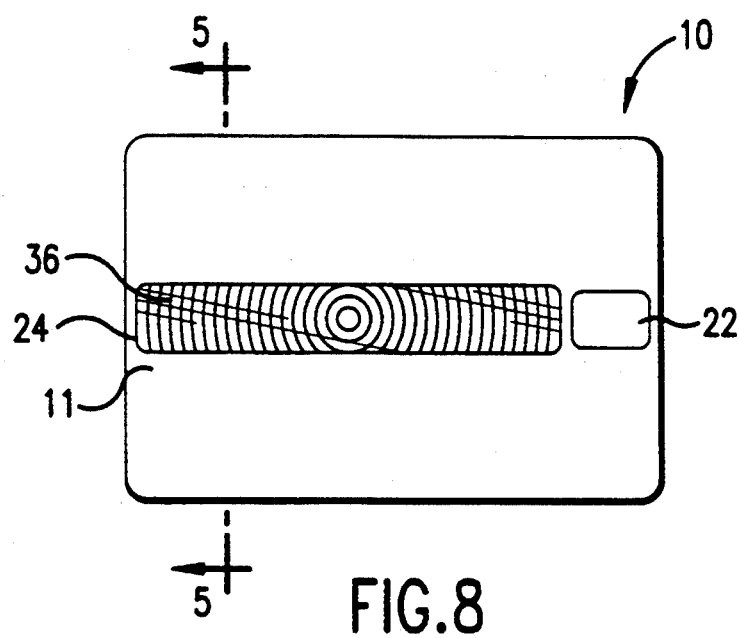
FIG. 8 shows the top side of a credit card having an integral horizontally-extending magnifying lens and a hologram patch.

As with the preceding embodiments, magnetic strips, signature strips, hologram patches, etc. can also be added in the conventional manner. For example, in FIG. 8, an embodiment of a card 10 includes a lens 24 which horizontally extends partially across credit card base 11. Card 10 also includes hologram patch 22.

Figure 9:
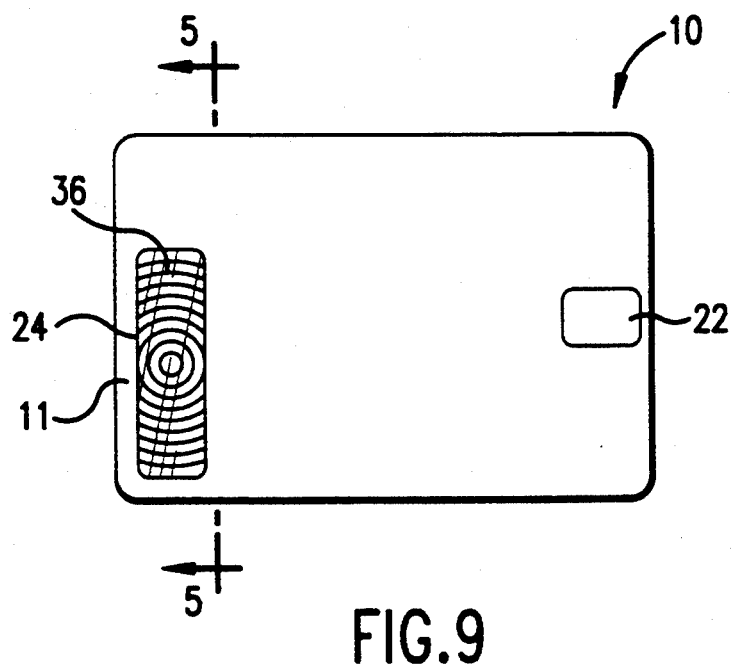
FIG. 9 shows the top side of a credit card having an integral vertically-extending magnifying lens and a hologram patch.

Another embodiment, shown in FIG. 9, includes a vertically-oriented lens 24 stamped on one side of credit card base 11, with hologram patch 22 disposed near the opposite side of credit card base 11. Such an embodiment can, of course, also be produced by mounting a separate lens 24 in a credit card base 11 in a manner similar to the embodiment shown in FIG. 1.

An embodiment of the type shown in FIGS. 6 and 7, i.e. with a lens integral with core 48', could have a top and bottom layout as shown in FIGS. 3 and 4, i.e. with a lens 124 of square outline.

What is claimed is:

1. A financial transaction card adapted for individual use in reading information stored externally to the card, the card of the type having machine readable information contained thereon identifying the user and the issuing institution for transacting business at locations remote from the issuing institution, the card comprising:

a. a rigid substantially rectangular base comprising a core of a substantially transparent material and having a top surface and a bottom surface, a top layer of sheet material secured to the top surface of said core and a bottom layer of sheet material secured to the bottom surface of said core, each said layer having an opening and the opening in said first layer being aligned with the opening in said second layer;

b. machine readable information carried on one of the layers for identifying the user and the issuing institution; and c. a magnifying lens produced by formation of fresnel contour lines on the top surface of the core in the opening of said first layer and in non-interfering relationship with the machine readable information.

2. The financial transaction card of claim 1, wherein the core comprises an amorphous plastic material.

3. The financial transaction card of claim 2, wherein the plastic material is selected from the group consisting of polyvinyl chloride, polycarbonate and polyester.

4. The financial transaction card of claim 1, further comprising a magnetic tape strip adapted for carrying magnetically encoded machine readable information, the strip being secured to one of said layers.

5. The financial transaction card of claim 4, wherein the magnetic tape strip spans the base of the card and is disposed parallel to the longitudinal axis thereof, and wherein the magnifying lens is an elongated rectangle parallel to the magnetic tape strip.

6. The financial transaction card of claim 1, further comprising a predetermined area on said top layer adapted to be embossed with raised alpha-numeric indicia to provide alpha-numeric information identifying the user and the issuing institution.

7. The financial transaction card of claim 1, wherein the base is subdivided into a plurality of zones, including a data zone for the machine readable information and a non-data zone which is free of any machine readable information.

8. The financial transaction card of claim 7, wherein the magnifying lens is formed within the non-data zone.

9. The financial transaction card of claim 7, wherein the data zone includes a section adapted for receiving a magnetic information strip adapted for carrying magnetically encoded machine readable information.

10. The financial transaction card of claim 7, wherein the data zone includes a section adapted to receive embossed lettering comprising alpha-numeric indicia identifying the user and the issuing institution.

11. The financial transaction card of claim 7, further comprising a signature strip located on one of said layers in the data zone and adapted for receiving a manually applied signature of the user.

12. The financial transaction card of claim 1, wherein the magnifying lens has a substantially square peripheral contour.

13. A credit card for point-of-sale credit transactions, adapted for use in reading information stored externally to the card, the card including machine readable information thereon for identifying the card user and the issuing institution, the card comprising a rigid substantially rectangular sheet of transparent material, and the card having a top surface and a bottom surface and including a data zone wherein the machine readable information is located and a non-data zone free of machine readable information, the card further comprising a magnifying lens produced by formation of fresnel contour lines on the sheet at the top surface of the card and in non-interfering relationship with the machine readable information.

14. The credit card of claim 13, wherein the sheet comprises an amorphous plastic material.

15. The credit card of claim 14, wherein the plastic material is selected from the group consisting of polyvinyl chloride, polycarbonate and polyester.

16. The credit card of claim 13, further comprising a magnetic encoding strip secured to the bottom surface of the card and adapted for receiving and storing magnetically encoded machine readable information identifying the card user and the issuing institution, and a signature strip on the bottom surface of the card adapted for receiving a manually applied signature.

17. The credit card of claim 16, wherein a portion of the data zone is adapted for receiving embossed alpha-numeric indicia in a machine readable format in non-interfering relationship with the magnetic encoding strip and the signature strip.

18. The credit card of claim 16, wherein the magnetic strip spans card and is disposed parallel to the longitudinal axis thereof, and wherein the magnifying lens is an elongated rectangle in the sheet parallel to the magnetic tape strip.

19. The credit card of claim 13, wherein the magnifying lens has a substantially square peripheral contour.

20. The credit card of claim 13, further comprising a top layer of sheet material secured to the sheet and forming the top surface of the card and a bottom layer of sheet material secured to the sheet and forming the bottom surface of the card.

21. A card containing information and adapted for use in reading information stored externally to the card, the card having atop surface and a bottom surface; and the card comprising:
   a substantially non-foldable rigid sheet of substantially transparent material; and
   a magnifying lens produced by formation of fresnel contour lines on the sheet at the top surface of the card and in non-interfering relationship with the information contained on said card.

22. The card of claim 21, wherein the sheet comprises an amorphous plastic material.

23. The card of claim 22, wherein the plastic material is selected from the group consisting of polyvinyl chloride, polycarbonate and polyester.

24. The card according to claim 21 further including a magnetic strip secured to at least one of the surfaces of the card.

25. The card according to claim 21 wherein the card has a length and the lens extends substantially across the entire length of the card.

* * * * *